US012218363B2

(12) United States Patent
Kang et al.

(10) Patent No.: US 12,218,363 B2
(45) Date of Patent: Feb. 4, 2025

(54) RECHARGEABLE BATTERY AND METHOD FOR WELDING RECHARGEABLE BATTERY (71) Applicant: SAMSUNG SDI CO., LTD., Yongin-si (KR)

(72) Inventors: Junil Kang, Yongin-si (KR); Jinnam Kim, Yongin-si (KR); Yongseok Oh, Yongin-si (KR); Sunghyun Kim, Yongin-si (KR); Sunghoon Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 1054 days.

(21) Appl. No.: 17/261,257

(22) PCT Filed: Mar. 8, 2019

(86) PCT No.: PCT/KR2019/002734
§ 371 (c)(1),
(2) Date: Jan. 19, 2021

(87) PCT Pub. No.: WO2020/017727
PCT Pub. Date: Jan. 23, 2020

(65) Prior Publication Data
US 2021/0273282 A1 Sep. 2, 2021

(30) Foreign Application Priority Data
Jul. 18, 2018 (KR) .................. 10-2018-0083637

(51) Int. Cl.
H01M 50/169 (2021.01)
H01M 50/147 (2021.01)
(Continued)

(52) U.S. Cl.
CPC ....... H01M 50/169 (2021.01); H01M 50/147 (2021.01); H01M 50/15 (2021.01);
(Continued)

(58) Field of Classification Search
CPC ............ B23K 2101/36; B23K 26/0608; B23K 26/206; B23K 26/24; H01M 50/103;
(Continued)

(56) References Cited

U.S. PATENT DOCUMENTS

2007/0128514 A1  6/2007  Yoshida
2011/0042361 A1  2/2011  Nowak et al.
(Continued)

FOREIGN PATENT DOCUMENTS

CN  101992350 A  3/2011
CN  106252534 A  12/2016
(Continued)

OTHER PUBLICATIONS

Korean Office Action dated Jul. 27, 2023, of the corresponding Korean Patent Application No. 10-2018-0083637.
(Continued)

Primary Examiner — Lingwen R Zeng
(74) Attorney, Agent, or Firm — Lee IP Law, P.C.

(57) ABSTRACT

A rechargeable battery includes a case having an opening and accommodating an electrode assembly therein; a cap plate closing and sealing the opening; and a welding bead part along a circumference of the cap plate and at a contact surface of the case and the cap plate, wherein the welding bead part includes first and second regions on a cross-section vertical to a welding progressing direction of the welding bead part, the first region has a first boundary line on the cross-section, a contact surface is between end parts of the first boundary line, the second region has a second boundary line on the cross-section, the first region is between end parts of the second boundary line to form first and second contact points in contact with the first boundary line, the first region is deeper than the second region, and the second region is wider than the first region.

20 Claims, 7 Drawing Sheets (51) Int. Cl.
*H01M 50/15* (2021.01)
*B23K 26/06* (2014.01)
*B23K 26/20* (2014.01)
*B23K 26/24* (2014.01)
*B23K 101/36* (2006.01)
*H01M 50/103* (2021.01)
*H01M 50/502* (2021.01)
*H01M 50/609* (2021.01)

(52) U.S. Cl.
CPC ........ *B23K 26/0608* (2013.01); *B23K 26/206* (2013.01); *B23K 26/24* (2013.01); *B23K 2101/36* (2018.08); *H01M 50/103* (2021.01); *H01M 50/502* (2021.01); *H01M 50/609* (2021.01); *Y02E 60/10* (2013.01)

(58) Field of Classification Search
CPC .. H01M 50/147; H01M 50/15; H01M 50/169; H01M 50/502; H01M 50/609; Y02E 60/10
See application file for complete search history.

(56) References Cited

U.S. PATENT DOCUMENTS

| | | |
|---|---|---|
| 2013/0223792 A1 | 8/2013 | Huber et al. |
| 2015/0183058 A1 | 7/2015 | Sugiyama et al. |
| 2015/0293306 A1 | 10/2015 | Huber et al. |
| 2015/0349303 A1* | 12/2015 | Umeyama ............ B23K 26/20 219/121.64 |
| 2016/0365546 A1 | 12/2016 | Umeyama et al. |
| 2017/0077543 A1 | 3/2017 | Umeyama et al. |
| 2018/0147661 A1 | 5/2018 | Salokatve et al. |

FOREIGN PATENT DOCUMENTS

| | | |
|---|---|---|
| CN | 106312314 A | 1/2017 |
| CN | 107850726 A | 3/2018 |
| DE | 102015106786 A1 | 12/2015 |
| DE | 102016110488 A1 | 12/2016 |
| EP | 2859986 A1 | 4/2015 |
| EP | 3308202 A2 | 4/2018 |
| JP | 2007-157519 A | 6/2007 |
| JP | 5570396 B2 | 8/2014 |
| JP | 5600838 B2 | 10/2014 |
| JP | 2015-163412 A | 9/2015 |
| KR | 10-2014-0098268 A | 8/2014 |
| KR | 10-2016-0146548 A | 12/2016 |
| KR | 10-2017-0031619 A | 3/2017 |
| KR | 10-2018-0015619 A | 2/2018 |
| WO | WO 2015/114445 A2 | 8/2015 |
| WO | WO 2016/198724 A2 | 12/2016 |

OTHER PUBLICATIONS

European Search Report dated Jun. 24, 2022.
Chinese Office action and Search Report dated Aug. 1, 2022.
Chinese Patent Announcement dated Apr. 4, 2023.
International Search Report dated Jun. 11, 2019 for PCT/KR2019/002734.

* cited by examiner

RECHARGEABLE BATTERY AND METHOD FOR WELDING RECHARGEABLE BATTERY

CROSS REFERENCE TO RELATED APPLICATIONS

This is the U.S. national phase application based on PCT Application No. PCT/KR2019/002734, filed Mar. 8, 2019, which is based on Korean Patent Application No. 10-2018-0083637, filed Jul. 18, 2018, the entire contents of all of which are hereby incorporated by reference.

TECHNICAL FIELD

The present invention relates to a rechargeable battery and a welding method of a rechargeable battery, and relates to a rechargeable battery and a welding method of a rechargeable battery in which a cap plate is bonded to one surface of a case by a welding.

BACKGROUND ART

Rechargeable batteries can be repeatedly charged and discharged, unlike primary batteries that cannot be recharged. Low-capacity rechargeable batteries are used for portable compact electronic apparatuses such as mobile phones, notebook computers, and camcorders, and high-capacity rechargeable batteries are widely used as a power source for driving a motor of a hybrid vehicle, etc.

As for rechargeable batteries, various developments have been made to improve the energy density thereof, such as the development of high power rechargeable batteries using a high energy density non-aqueous electrolyte.

The rechargeable battery may be provided with the case where the electrode assembly is accommodated with an opened state on its one side, and the inner space of the case may be closed and sealed by attaching the cap plate to the one side of the case where the electrode assembly is embedded.

Welding may be used as a method of bonding the cap plate to the case, and in this case, it is an important task to improve welding quality by suppressing the occurrence of pores or spatter while satisfying the required bonding force between the cap plate and the case.

The above information disclosed in this Background section is only for enhancement of understanding of the background of the invention, and therefore it may contain information that does not form the prior art that is already known in this country to a person of ordinary skill in the art.

DISCLOSURE

Technical Problem

An exemplary embodiment of the present invention is to provide a welding method of a rechargeable battery and a rechargeable battery with improved welding quality while effectively satisfying the required bonding strength between the cap plate and the case.

Technical Solution

A rechargeable battery according to an exemplary embodiment of the present invention includes: a case in which an electrode assembly is accommodated in an inner space and one side is opened; a cap plate closing and sealing one surface of the case; and a welding bead part formed along a circumference of the cap plate and formed at a contact surface of the case and the cap plate, wherein the welding bead part includes a first region and a second region on a cross-section vertical to a welding progressing direction of the welding bead part, the first region has a first boundary line on the cross-section, a contact surface is disposed between both end parts of the first boundary line, the second region has a second boundary line on the cross-section, the first region is disposed between both end parts of the second boundary line to form a first contact point and a second contact point in contact with the first boundary line, the first region has a deeper depth than the second region, and the second region has a wider width than the first region.

The first contact point and the second contact point may have a depth of 30-60% based on the highest depth of the first region.

Based on the width direction of the welding bead part, the first contact point and the second contact point may be positioned between 40-60% with respect to any of both end parts of the second boundary line on the contact surface.

The first contact point and the second contact point may have the different depths.

The second boundary line may be formed asymmetrically so that both sides have the different depths based on the contact surface.

The second boundary line may have one end closer to the inner space of both end parts and having a shallower depth than the other end.

The first contact point may be disposed closer to the inner space than the second contact point, and the second contact point may have the deeper depth than the first contact point.

On the other hand, a welding method of a rechargeable battery according to an exemplary embodiment of the present invention includes: disposing a cap plate on one surface of a case where an electrode assembly is accommodated inside and one surface is opened; and forming a welding bead part by welding a contact surface between the cap plate and the case along a circumference of the cap plate, where in the welding, the welding bead part is formed to have a first region and a second region on a cross-section vertical to a welding progressing direction, the first region has a first boundary line, the contact surface is disposed between both end parts of the first boundary line, the second region has a second boundary line, the first region is positioned between both end parts of the second boundary line to form a first contact point and a second contact point in contact with the first boundary line, the first region is formed to have a deeper depth than the second region, and the second region is formed to have a wider width than the first region.

In the welding, the first region may be formed by a keyhole welding method using a first laser beam, and the second region may be formed by a conduction welding method using a second laser beam.

In the welding, the second laser beam may be simultaneously irradiated to the front and rear of the first laser beam based on the welding progressing direction.

In the welding, the second laser beam may be separated from the first laser beam and may be irradiated in a ring form surrounding the first laser beam.

The welding may form different depths of both sides of the second region based on the contact surface.

Based on the contact surface, one side of the second region may be positioned closer to the inner space than the other side, and in the welding, the depth of one side of the second region may be shallower than that of the other side.

The first contact point may be disposed closer to the inner space than the second contact point, and the welding may form the depth of first contact point to be shallower than that of second contact point.

Advantageous Effects

An exemplary embodiment of the present invention may provide the rechargeable battery and the welding method of the rechargeable battery, in which welding quality is improved while effectively satisfying the required bonding strength between the cap plate and the case.

MODE FOR INVENTION

In the following detailed description, only certain exemplary embodiments of the present invention have been shown and described, simply by way of illustration.

As those skilled in the art would realize, the described embodiments may be modified in various different ways, all without departing from the scope of the present invention. Accordingly, the drawings and description are to be regarded as illustrative in nature and not restrictive. Like reference numerals designate like elements throughout the specification.

In this specification, redundant descriptions for the same constituent elements will be omitted.

In this specification, it is to be understood that when one component is referred to as being "connected" or "coupled" to another component, it may be connected or coupled directly to the other component or be connected or coupled to the other component with a further component intervening therebetween. On the other hand, in this specification, it is to be understood that when one component is referred to as being "connected" or "coupled directly" to another component, it may be connected or coupled to the other component without another component intervening therebetween.

It is also to be understood that the terminology used herein is only for the purpose of describing particular embodiments, and is not intended to be limiting of the invention.

Singular forms are to include plural forms unless the context clearly indicates otherwise.

It will be further understood that term "comprises" or "have" used in the present specification specify the presence of stated features, numerals, steps, operations, components, parts, or a combination thereof, but does not preclude the presence or addition of one or more other features, numerals, steps, operations, components, parts, or a combination thereof.

Also, as used herein, the term "and/or" includes any plurality of combinations of items or any of a plurality of listed items. In this specification, "A or B" may include "A", "B", or "A and B".

Figure 1:
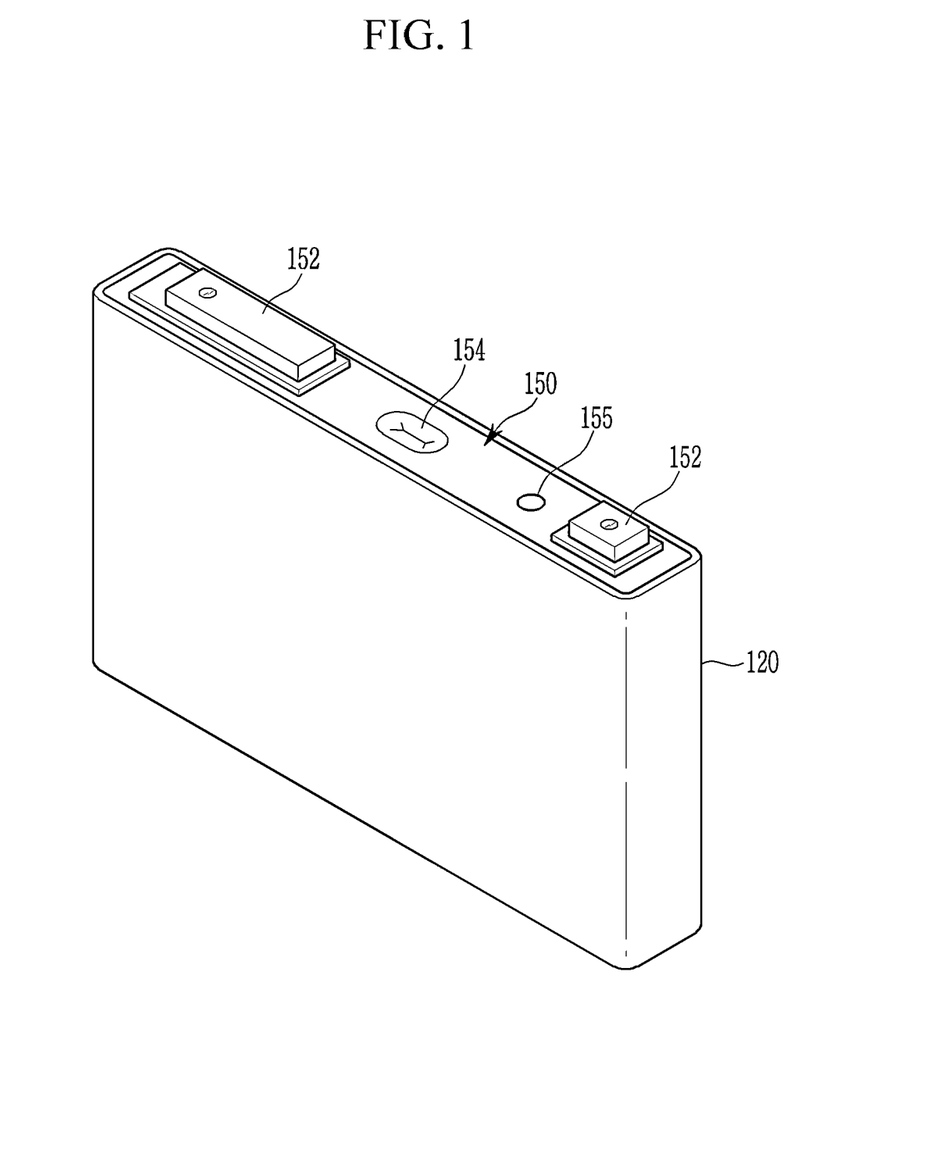
FIG. 1 is a view showing a rechargeable battery according to an exemplary embodiment of the present invention.
Figure 2:
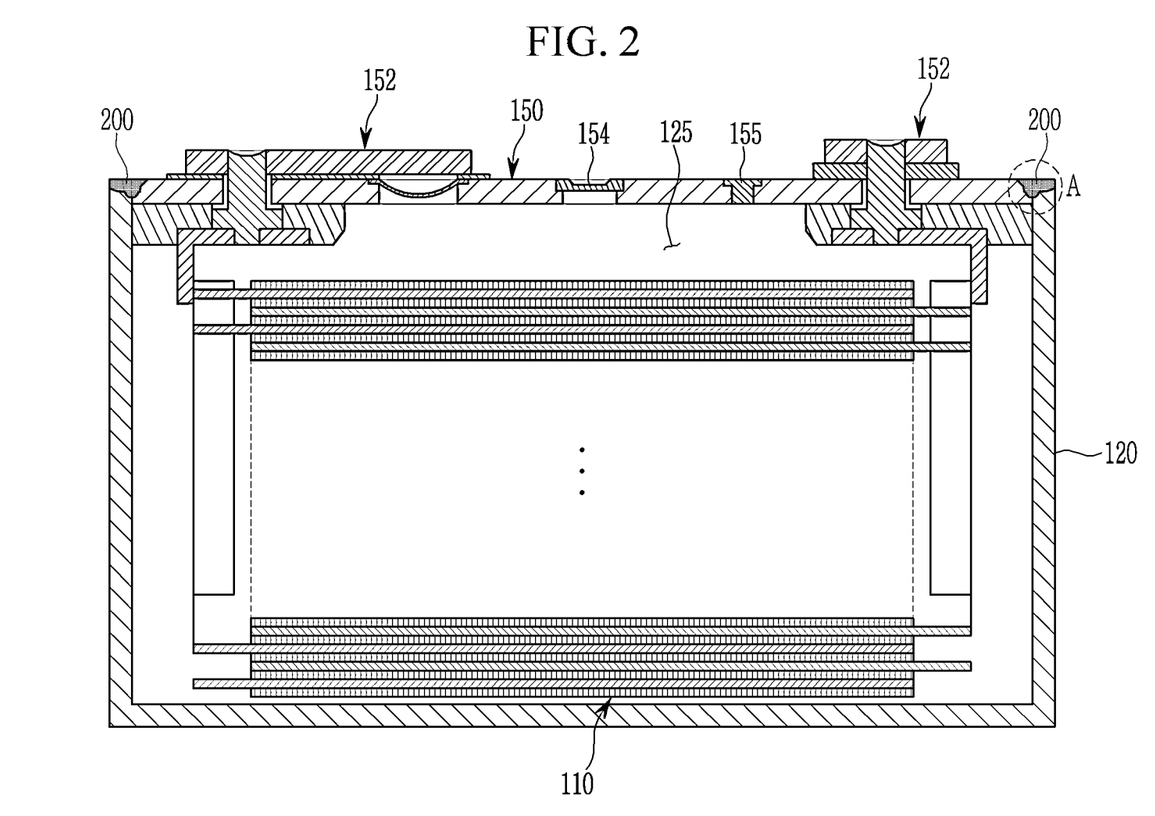
FIG. 2 is a view showing a cross-section of a rechargeable battery according to an exemplary embodiment of the present invention.

FIG. 1 is a view showing a rechargeable battery according to an exemplary embodiment of the present invention, and FIG. 2 is a view showing a cross-section of a rechargeable battery according to an exemplary embodiment of the present invention. The rechargeable battery according to an exemplary embodiment of the present invention includes an electrode assembly 110 including a first electrode, a second electrode, and a separator, a case 120 accommodating the electrode assembly 110 and having one opened surface, and a cap plate 150 bonded to the one opened surface of the case 120.

The rechargeable battery is exemplarily illustrated as a prism-shaped lithium ion rechargeable battery. However, the present invention is not limited thereto, and it can be applied to various types of batteries such as a lithium polymer battery or a cylindrical battery and the like.

The rechargeable battery may be used as an energy source for equipment operating with electrical energy, such as hybrid electric vehicles (HEVs), electric vehicles (EVs), cordless cleaners, electric bicycles, and electric scooters.

The electrode assembly 110 is shown in FIG. 2 and includes the first electrode, the second electrode, and the separator. The electrode assembly 110 may be provided in a plurality, and may be in a form to be flat and pressurized after being wound around a winding shaft in a state interposing the separator between the first electrode and the second electrode.

The first electrode and the second electrode may include a coated region, which is a region coated with an active material on a thin plate formed of a metal foil, and an uncoated region, which is a region to which the active material is not coated.

The coated region of the first electrode may be formed by coating an active material such as a transition metal oxide to a metal foil such as aluminum, and the coated region of the second electrode may be formed by coating an active material such as graphite or carbon to a metal foil such as copper or nickel.

The uncoated region of the first electrode and the uncoated region of the second electrode may be respectively protruded from one side of the coated region of the first electrode and the coated region of the second electrode in the length direction of the case 120, and the uncoated region of the first electrode and the uncoated region of the second electrode may be disposed to be separated by a distance and have different polarities.

Meanwhile, when the first electrode and the second electrode are disposed to overlap based on the length direction of the case 120, the uncoated region of the first electrode and the uncoated region of the second electrode may be formed by overlapping a plurality of thin films. When a plurality of thin films are formed to be overlapped, the thin films may be connected to be in contact with each other by ultrasonic welding to facilitate current movement Since the uncoated region of the first electrode and the uncoated region of the second electrode are formed by cutting to be protruded from the metal foil, they may be integrally formed with the metal foil of the coated region of the first electrode and the coated region of the second electrode, respectively.

The separator is positioned between the coated region of the first electrode and the coated region of the second electrode and serves to prevent short circuits and allow lithium ions to be movable, and for example, it may be formed of a composite film of polyethylene, polypropylene, polyethylene, or polypropylene.

The electrode assembly 110 may be inserted into the case 120 with the winding shaft parallel to the length direction of the case 120, and the electrode assembly 110 is substantially embedded in the case 120 with an electrolyte solution. The electrolyte solution may be made of lithium salts such as LiPF6 and LiBF4 in an organic solvent such as EC, PC, DEC, EMC, and DMC The electrolyte solution may be liquid, solid, or gel.

Meanwhile, in the case 120, the electrode assembly 110 is embedded and one surface is opened. In the case 120, an inner space 125 where the electrode assembly 110 and the electrolyte solution are accommodated is formed, and an opening is formed on one surface with an approximately cuboid shape. The opening in the case 120 allows the electrode assembly 110 to be inserted into the interior of the case 120.

The case 120 may be made of a metal such as aluminum or stainless steel. If necessary, the case 120 may be electrically connected to one of the first electrode and the second electrode.

Meanwhile, the cap plate 150 is attached to the one opened surface of the case 120. The cap plate 150 may be provided in a shape corresponding to the shape of the one opened surface of the case 120, and when the case 120 has an approximately cuboid shape, the cap plate 150 may be in the form of a plate extending in one direction.

The cap plate 150 may be formed of the same material as the case 120 and may be coupled to the case 120 by laser welding or the like The cap plate 150 may be electrically connected to the case 120, and when the case 120 is electrically connected to the first or second electrode of the electrode assembly 110, the cap plate 150 may have the same polarity as the case 120.

The cap plate 150 may include an electrolyte injection opening 155 for injecting the electrolyte solution, a vent hole 154 where a vent plate with a notch is installed to be opened at a predetermined opening pressure, and a short-circuit hole to which a short-circuit member that short-circuits the rechargeable battery at a predetermined operation pressure is installed.

The electrolyte injection opening 155 has a circular or polygonal cross-sectional shape, and its size is not particularly limited as long as an electrolyte solution injection nozzle may be inserted and the strength of the cap plate 150 is not greatly deteriorated.

After the cap plate is bonded to the case 120, the electrolyte solution may be injected into the case 120 through the electrolyte injection opening 155. After the electrolyte solution injection, the electrolyte injection opening 155 may be sealed with a sealing stopper.

Also, in addition to the structure for sealing the electrolyte injection opening 155 with the sealing stopper, a filler such as a solder may be filled into the electrolyte injection opening 155 to be sealed through a soldering process.

The vent hole 154 is closed and sealed with a vent plate to release the internal pressure of the case 120. When the internal pressure of case 120 reaches a predetermined pressure, the vent plate is cut to open the vent hole 154. A notch may be formed in the vent plate to induce the cutting.

The short-circuit member is installed in the short-circuit hole. The short-circuit member may include a curved portion curved in a convex arc toward the electrode assembly 110 in a situation where the internal pressure of the case 120 is normal, and an edge portion provided outside the curved portion and fixed to the side wall of the short-circuit hole.

The terminal hole is penetrated by a column portion for electrically connecting the terminal part 152 and the electrode assembly 110. A sealing gasket for sealing the inside of the case 120 may be provided between the inner surface of the terminal hole and the column portion.

A terminal portion 152 is disposed on the cap plate 150. The terminal portion 152 may have a rectangular plate shape. The terminal portion 152 may be connected to a connection terminal of an external device requiring electrical energy or may be connected to a bus bar that connects each terminal portion 152 of a plurality of rechargeable batteries.

Again referring to FIG. 2, the rechargeable battery according to an exemplary embodiment of the present invention includes the case 120 in which the electrode assembly 110 is accommodated in an inner space 125 and one surface is opened, the cap plate 150 closing and sealing one surface of the case 120, and a welding bead part 200 formed along the circumference of the cap plate 150 and formed on the contact surface C of the case 120 and the cap plate 150.

Also, the welding bead part 200 includes a first region 210 and a second region 220 on the cross-section vertical to the welding progressing direction W of the welding bead part 200, the first region 210 has a first boundary line 215 on the cross-section, the contact surface C is positioned between both end parts of the first boundary line 215, the second region 220 has a second boundary line 225 on the cross-section, the first region 210 is positioned between both end parts of the second boundary line 225 and then a first contact point 232 and a second contact point 234 that are in contact with the first boundary line 215 are formed, the first region 210 has a deeper depth than the second region 220, and the second region 220 has a wider width than that of the first region 210.

According to an exemplary embodiment of the present invention, in the case 120, the upper surface is opened as shown in FIG. 2. In some cases, the case 120 may be provided with a shape that the side or bottom surface is opened other than the upper surface.

According to an exemplary embodiment of the present invention, the cap plate 150 provided in a shape corresponding to the one opened surface of the case 120 is disposed on the one opened surface of the case 120 and is coupled to the case 120. In an exemplary embodiment of the present invention, the case 120 and the cap plate 150 are coupled through the welding, so that the cap plate 150 closes and seals the one opened surface of the case 120.

FIG. 2 shows the structure in which the edge of the cap plate 150 is in contact with the inner surface of the side wall of the case 120. However, in some cases, the edge of the cap plate 150 may be disposed to be in contact with the upper surface of the side wall of the case 120.

Hereinafter, for explanation of the present invention, as an exemplary embodiment of the present invention, the description is based on the structure in which the upper surface of the case 120 is opened, the cap plate 150 is coupled to the upper surface, and the border of the cap plate 150 is inserted so as to be in contact with the inner surface of the side wall of the case 120.

Figure 3:
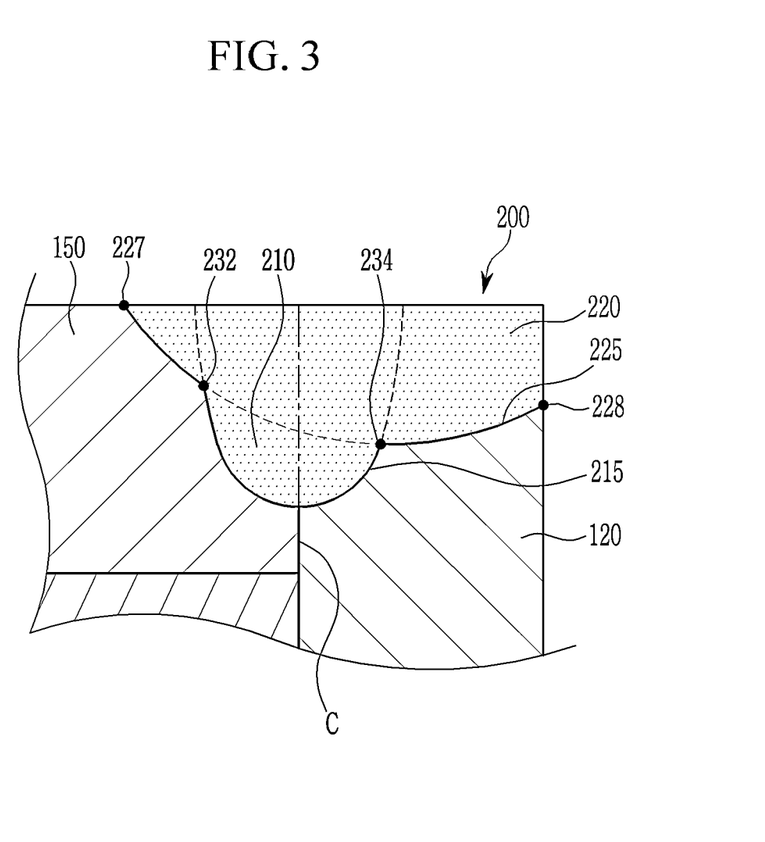
FIG. 3 is an enlarged view of a region A of FIG. 2.

FIG. 2 shows the shape in which the welding bead part 200 is formed on the contact surface C between the cap plate 150 and the case 120, and FIG. 3 shows the view enlarging the region A representing the welding bead part 200 in FIG. 2.

The welding bead part 200 refers to a part where the welding has been performed, and refers to a part where a molten pool has been formed by welding heat for example. According to an exemplary embodiment of the present invention, the welding bead part 200 is formed along the edge of the cap plate 150 in contact with the side wall of the case 120.

That is, the welding bead part 200 is formed including at least a portion of the contact surface C between the cap plate 150 and the case 120, and is formed extending along the rim of the cap plate 150 to form a closed curved line, and accordingly, the cap plate 150 closes and seals the inner space 125 of the case 120.

FIG. 3 shows the first region 210 and the second region 220 of the welding bead part 200. The welding bead part 200 includes the first region 210 and the second region 220 and, in the present invention, the first region 210 and the second region 220 are defined by distinguishing the region where the melting occurs by the welding.

The first region 210, as shown in FIG. 3, forms the first boundary line 215 on the cross-section vertical to the welding progressing direction W. The welding progressing direction W may be the same as the rim direction of the cap plate 150.

The first region 210 may be divided into the first region 210 in which the welding is performed based on the first boundary line 215 and a portion in which the melting is not generated by the welding heat. FIG. 3 schematically shows the first boundary line 215.

In the first region 210, as shown in FIG. 3, the contact surface C between the cap plate 150 and the case 120 is positioned between both end parts of the first boundary line 215. That is, the first region 210 is melted, including the part of the contact surface C between the cap plate 150 and the case 120.

Meanwhile, as shown in FIG. 3, the second region 220 is distinguished from the surroundings through the second boundary line 225, and the second boundary line 225 has the first contact point 232 and the second contact point 234 in contact with the first boundary line 215 and is formed to have a wider width than the first region 210.

In the second region 220, the first region 210 is positioned between both end parts of the second boundary line 225. Therefore, the second region 220 has a shape in which the first region 210 and at least a part thereof overlap.

FIG. 3 shows the second region 220 that is divided into the second boundary line 225 and has a wider width than the first region 210 according to an exemplary embodiment of the present invention, and the shape that the second region 220 includes the first region 210 based on the width direction is shown.

Figure 4:
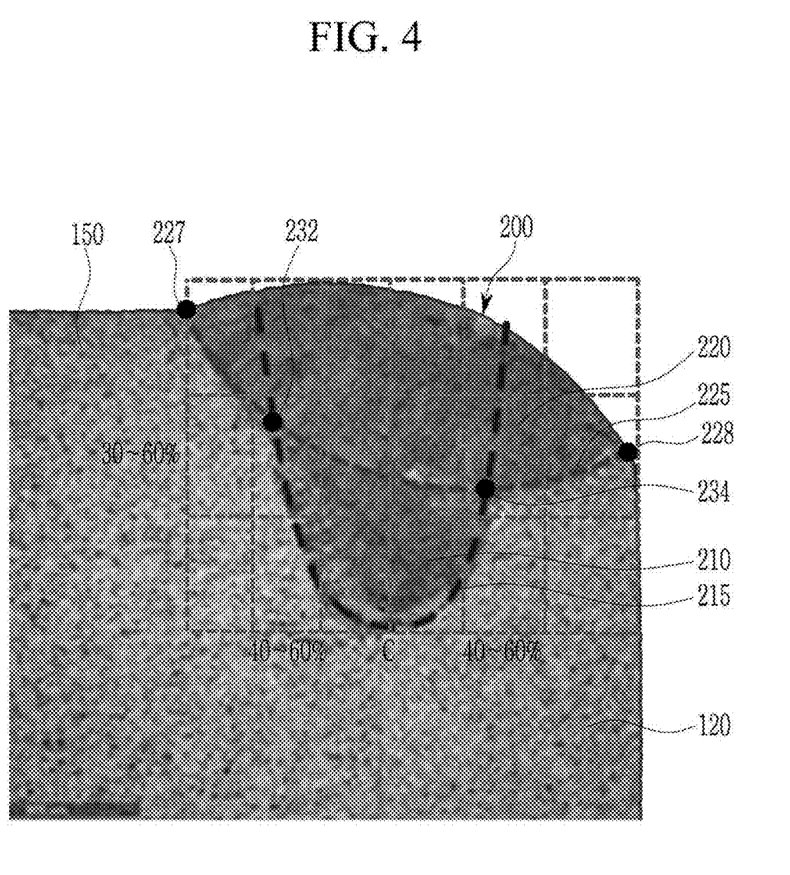
FIG. 4 is a view showing an actual state that a cap plate and a case are welded according to an exemplary embodiment of the present invention.

In FIG. 4 according to an exemplary embodiment of the present invention, like in FIG. 3, the actual shape of the welding bead part 200 where the welding is performed between the cap plate 150 and the case 120 is shown. In the present invention, the first region 210 and the second region 220 have the partial overlapping form, and as shown in FIG. 4, it may be difficult to distinguish the first boundary line 215 and the second boundary line 225 in the portion where the first region 210 and the second region 220 overlap.

Thus, in FIG. 3 and FIG. 4, the first boundary line 215 and the second boundary line 225 at the overlapped region of the first region 210 and the second region 220 are indicated by dotted lines. Meanwhile, the first contact point 232 and the second contact point 234 where the first boundary line 215 and the second boundary line 225 meet may correspond to an inflection point at the outline of the welding bead part 200, preferably a bending point at which a curvature is discontinuously changed.

As described above, the first boundary line 215 and the second boundary line 225 may form a single contour of the welding bead part 200 by the overlapping of the first region 210 and second region 220, and when assuming the situation that the first boundary line 215 and the second boundary line 225 are mutually and independently formed, they form the curved lines of different curvatures, respectively.

However, due to the overlapping of the first region 210 and second region 220, since a part of the first boundary line 215 and a part of the second boundary line 225 form the single contour of the welding bead part 200, the contour of the welding bead part 200 appears as the inflection point or bending point where the curvature change occurs on the first contact point 232 and second contact point 234.

On the other hand, in an exemplary embodiment of the present invention, the depth corresponds to the depth of the corresponding point or part from the surface where the welding is performed, and in an exemplary embodiment of the present invention, the first region 210 and the second region 220 form the welded bead part 200 together and may have the same depth direction as each other. Also, the second region 220 has the shallower depth than the first region 210.

In the present invention, the comparison of the depth of the first region 210 and the second region 220 may mean a comparison of the greatest depth of each region. That is, as shown in FIG. 1 and FIG. 2, based on the structure that the cap plate 150 is inserted and coupled to the opened upper surface of the case 120, the second region 220 may have the lowermost end positioned above the first region 210 and may have the shape overlapping the upper portion of the first region 210.

In other words, the first region 210 has the deeper depth than the second region 220 and melts more contact surface C. That is, in the welding bead part 200 according to an exemplary embodiment of the present invention, improved bonding strength between the case 120 and the cap plate 150 is realized through the first region 210.

The electrolyte solution is accommodated in the inner space 125 of the case 120, and a leakage of the electrolyte solution through the contact surface C between the case 120 and the cap plate 150 is related to a risk on safety and battery quality.

Therefore, the bonding quality between the case 120 and the cap plate 150 is important, and this bonding quality may be achieved through the formation of the first region 210 having the deep depth.

However, a laser or the like may be used during the welding, and in order to increase the depth, energy of the laser for welding such as the welding heat or the welding energy, for example, must be increased.

In order to form the first region 210 according to an exemplary embodiment of the present invention, a keyhole welding method using a laser may be used, and the keyhole welding method is a method of welding using higher welding heat than vaporization heat of a base material.

The first region 210, which may be formed by the keyhole welding method, is formed to have the deep depth and increases the depth at which welding occurs at the contact surface C between the cap plate 150 and the case 120, thereby the bonding strength between the cap plate 150 and the case 120 is effectively improved.

On the other hand, if it is intended to increase the energy density by increasing the inner space 125 of the case 120 in the volume of the same case 120 such as a capacity increase of the electrolyte solution of the rechargeable battery, the side wall thickness of the case 120 may be reduced.

In the case of reducing the thickness of the side wall of the case 120 as described above, the formation of the welding bead part 200 having the deep depth, such as the formation of the first region 210 of the present invention, has an advantage, but the high welding heat for the formation of the deep depth is applied to the base material such that scattering products may be formed on the surface of the welding bead part 200 like pores or spatter.

These pores or spatter may adversely affect the bonding strength due to the welding and may affect product properties such as merchandising of the welding surface. An exemplary embodiment of the present invention is to suppress the generation of the pores or spatter due to the formation of the first region 210 by forming the second region 220.

The second region 220 may be formed including at least a portion of the first region 210 and may have the wider width while having the shallower depth than the first region 210. That is, based on a point of the welding bead part 200, the second region 220 includes the first region 210 and may be formed wider.

The second region 220 has the shallower depth than the first region 210, so lower welding heat is used. In addition, the formation of the molten pool in the second region 220 is advantageous in removing or suppressing the pores or spatter that may occur in the formation of the first region 210.

For example, the gas generated in the formation of the first region 210 may be discharged to the outside of the base material by the second region 220, and a circular surface condition may be maintained while the spatter maintains the molten state during the formation process of the second region 220 even if the scattering products such as the spatter on the surface occur.

That is, in an exemplary embodiment of the present invention, in forming the welding bead part 200 between the cap plate 150 and the case 120, as the different melting methods in which the welding bead part 200 is processed by the different welding heats, etc. are preferably simultaneously performed, so as to form the first region 210 having the deep depth and the second region 220 having the wide width simultaneously, the bonding strength by the welding may be effectively improved and the welding quality may also be improved.

Meanwhile, FIG. 4 shows the actual appearance of the welding bead part 200 formed on the rechargeable battery according to an exemplary embodiment of the present invention, and the position, etc. of the first contact point 232 and the second contact point 234 is marked based on the depth and the width of the welding bead part 200.

As shown in FIG. 4, in an exemplary embodiment of the present invention, the first contact point 232 and the second contact point 234 may have the depth of 30-60% based on the maximum depth of the first region 210.

That is, when the vertical distance from the point where the highest depth is formed in the first region 210 to the surface of the cap plate 150 is defined as 100%, the first contact point 232 and the second contact point 234 where the first boundary line 215 and the second boundary line 225 meet may have the depth of 30-60%.

When the first contact point 232 and second contact point 234 have the depth of less than 30% for example, even if the second region 220 is formed, the effect of suppressing the pore formation in the highest depth region of the first region 210 may be halved, and for example, when the depth is higher than 60%, too much energy is consumed to form the second region 220 and the damage of the base material such as the cap plate 150 may be caused, which may be disadvantageous.

Accordingly, as an exemplary embodiment of the present invention forms the first contact point 232 and the second contact point 234 to have the depth of 30-60%, it is possible to efficiently form the second region 220 when energy consumption is considered while effectively preventing or suppressing the occurrence of the pore or the spatter when forming the first region 210 by the second region 220.

However, the present invention is not necessarily limited thereto, and the depth of the first contact point 232 and the second contact point 234 may be changed according to the width of the side wall of the case 120 or the thickness of the cap plate 150.

Meanwhile, as shown in FIG. 4, in an exemplary embodiment of the present invention, the first contact point 232 and the second contact point 234 may be positioned between 40% to 60% for any one of both end parts of the second boundary line 225 at the contact surface C with reference to the width direction.

That is, in FIG. 4, when the horizontal distance from the contact surface C to both end parts of the second boundary line 225 is defined as 100%, the first contact point 232 may be positioned between 40-60% with respect to one end 227 of the second boundary line 225, and the second contact point 234 may be positioned between 40-60% with respect to the other end 228 of the second boundary line 225.

Since the horizontal distances from the contact surface C to one end 227 and the other end 228 of the second boundary line 225 may be different, the horizontal distance from the contact surface C to the first contact point 232 and the second contact point 234 in an exemplary embodiment of the present invention may be different from each other.

If the first contact point 232 and the second contact point 234 are less than 40% based on the width direction, too much energy may be consumed to form the second region 220, and the area occupied by the entire welding area may increase, which may limit the work.

On the other hand, when the first contact point 232 and the second contact point 234 are more than 60% based on the width direction, the relative width of the second region 220 to the first region 210 is narrow, so that the effect of suppressing the occurrence of the pores when forming the first region 210 may be halved.

In an exemplary embodiment of the present invention, it is necessary to adjust the width ratio of the second region 220 to the first region 210 in consideration of the relationship between the energy consumed for the welding and the welding quality, and accordingly, an exemplary embodiment of the present invention forms the second region 220 so that the contact point 232 and the second contact point 234 are positioned between 40-60% of the contact surface C and effectively improves the welding quality.

Meanwhile, in an exemplary embodiment of the present invention, the first contact point 232 and the second contact point 234 may have different depths. FIG. 3 and FIG. 4 show the first contact point 232 and the second contact point 234 having different depths.

In an exemplary embodiment of the present invention, in welding the case 120 and the cap plate 150 of the rechargeable battery to form the welding bead part 200, when considering the thickness of the side wall of the case 120 and the position of the contact surface C between the case 120 and the cap plate 150, if the depths of the first contact point 232 and the second contact point 234 are the same, there is a restriction on the work area for forming the welding bead part 200.

For example, when the side wall of the case 120 is formed thin, for the second region 220 formed to particularly have the wide width, the object that the heat is dissipated through the conduction, etc. is small closer to the exterior side of the side wall of the case 120, so that the energy may be concentrated and the depth of the welding may be deepened.

Alternatively, if the thickness of the cap plate 150 is reduced as needed, the closer the second region 220 is to the cap plate 150, the smaller the volume of the object to which heat is transferred, and thus the depth of the welding may be deepened.

Accordingly, in the present invention, by considering that the thickness of the side wall of the case 120 or the thickness of the cap plate 150 may be variously designed to improve the energy density or the manufacturing efficiency, the depths of the first contact point 232 and the second contact point 234 are formed differently in order to minimize the constraints according to the formation of the welding bead part 200 by the design change.

On the other hand, as shown in FIG. 3 and FIG. 4, the second boundary line 225 may be formed asymmetrically because both sides of the width direction have different depths based on the contact surface C.

Corresponding to the formation of the depths of the first contact point 232 and the second contact point 234 differently from each other, in an exemplary embodiment of the present invention, the depth of both sides of the second boundary line 225, preferably the maximum depth, may be formed differently from each other based on the contact surface C.

In the case of the first region 210, since the maximum depth is increased and the width is formed relatively narrow like by the keyhole welding method, according to an exemplary embodiment, the center of the first region 210 on the cross-section vertical to the welding progressing direction W may match the contact surface C of the case 120 and the cap plate 150.

In addition, even if the thickness of the cap plate 150 and the case 120 is changed due to the narrow width, there is little change in the level of heat conducted or dissipated to the periphery, so that the depths of both sides may be relatively uniform based on the contact surface C.

However, since the second region 220 corresponds to a welding region having the relatively shallow depth and the wide width, the depth change is likely to occur due to the less heat dissipation as closer the exterior side of the case 120, and accordingly, in the present invention, the second boundary line 225 distinguishing the second region 220 may be formed so that the maximum depths of both sides are different based on the contact surface C.

In other words, in an exemplary embodiment of the present invention, the second boundary line 225 may be formed so that one end 227 closer to the inner space 125 among both end parts in the width direction has a shallower depth than the other end 228.

As described above, for the second region 220 having the shallow depth and the wide width, due to the less heat dissipation closer to the exterior side of the base material, the depth may be deepened, and accordingly, in an exemplary embodiment of the present invention, the depth of the other end 228, which is positioned closer to the exterior side of the case 120, may be deeper than the one end 227, which is positioned closer to the inner space 125 of the case 120.

As an exemplary embodiment of the present invention, the other end 228 of the second boundary line 225 is formed to have the deeper depth than the one end 227 of the second boundary line 225 as above, so even when the side wall thickness of the case 120 is thin, it may be implemented in the shape depending on the design.

On the other hand, as shown in FIG. 3 and FIG. 4, in an exemplary embodiment of the present invention, the first contact point 232 may be positioned closer to the inner space 125 than the second contact point 234, and the second contact point 234 may have the deeper depth than the first contact point 232.

Like the change in the depth of the second boundary line 225, the first contact point 232 and the second contact point 234 formed by meeting the first boundary line 215 and the second boundary line 225 also have different depths, and furthermore, the thinner the side wall thickness of the case 120 is, the less heat dissipation at the point closer to the exterior side of the case 120 and the deeper the depth is, and in an exemplary embodiment of the present invention, the second contact point 234 may be formed to have the deeper depth than the first contact point 232 close to the inner space 125 of the case 120.

For example, forming the first contact point 232 and the second contact point 234 to have the same depth or the first contact point 232 to have the deeper depth must supply the welding heat to the inside of the side wall of the case 120 based on the contact surface C, however this increases the unnecessary energy consumption for the welding based on the contact surface C and furthermore may cause damage such as an unnecessary deformation of the cap plate 150 around the contact surface C, and this may be disadvantageous because it is more likely to occur as the thickness of the cap plate 150 is designed thinner.

Figure 5:
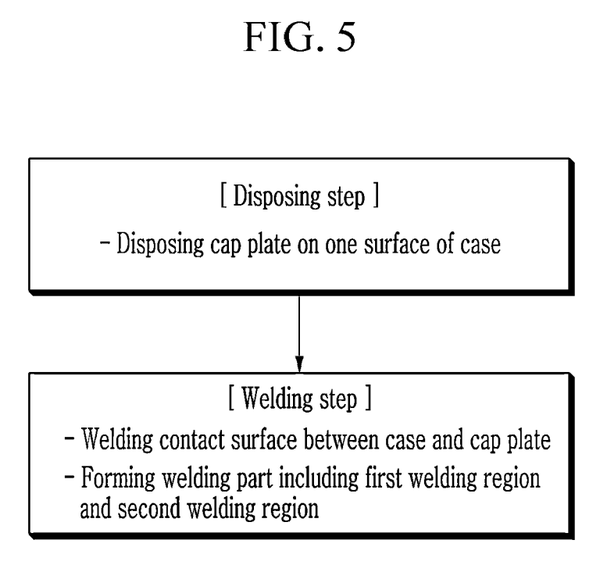
FIG. 5 is a flowchart of a welding method of a rechargeable battery according to an exemplary embodiment of the present invention.

FIG. 5 is a flowchart of a welding method of a rechargeable battery according to an exemplary embodiment of the present invention. Hereinafter, in the description of the welding method of the rechargeable battery according to an exemplary embodiment of the present invention, contents overlapping the previously described rechargeable battery are omitted as much as possible.

The welding method of the rechargeable battery according to an exemplary embodiment of the present invention includes a disposing step of disposing the cap plate 150 on one surface of the case 120 in which the electrode assembly 110 is accommodated and one surface is opened and the circumference of the cap plate 150, and a welding step of forming the welding bead part 200 by welding the contact surface C between the cap plate 150 and the case 120 along the circumference of the cap plate 150.

Also, in the welding step, the welding bead part 200 is formed to have a first region 210 and a second region 220 on the cross-section vertical to the welding progressing direction W, the first region 210 has the first boundary line 215 and the contact surface C is positioned between both end parts of the first boundary line 215, the second region 220 has the second boundary line 225 and the first region 210 is positioned between both end parts of the second boundary line 225 to form the first contact point 232 and the second contact point 234 that are in contact with the first boundary line 215, the first region 210 is formed to have the deeper depth than the second region 220, and the second region 220 is formed to have the wider width than the first region 210.

Specifically, in the dispose step, the cap plate 150 is disposed on the one opened surface of the case 120. The cap plate 150 may be disposed at the one opened surface of the case 120 to be in contact with the side wall of the case 120, and then the welding step is performed.

In the welding step, the welding is carried out along the circumference of the cap plate 150, the contact surface C between the cap plate 150 and case 120 is welded to join the cap plate 150 and the case 120 together while forming the welding bead part 200, and the inner space 125 of the case 120 is closed and sealed.

In the welding step, like the cross-section shown in FIG. 3 and FIG. 4, the welding bead part 200 is formed to have the first region 210 and the second region 220 on the cross-section vertical to the welding progressing direction W. The first region 210 and the second region 220 overlap each other and form one welding bead part 200 after the welding. In FIG. 3 and FIG. 4, the first boundary line 215 and the second boundary line 225, which appear when the first region 210 and the second region 220 are formed independently of each other, are shown including dotted lines.

In the welding step, the welding is performed to position the contact surface C between both end parts of the first boundary line 215 of the first region 210, and the welding is performed to position the first region 210 between both end parts of the second boundary line 225 of the second region 220.

In addition, as described above, the first region 210 is formed to have the deeper depth than the second region 220, and the second region 220 is formed to have the wider width than the first region 210.

Meanwhile, in the welding method of a rechargeable battery according to an exemplary embodiment of the present invention, the first region 210 may be formed by a keyhole welding method using a first laser beam 270, and the second region 220 may be formed by a conduction welding method using a second laser beam 280.

The first laser beam 270 has higher energy than the second laser beam 280 so that the first region 210 having the deep depth is formed. In addition, according to an exemplary embodiment of the present invention, the first laser beam 270 may form welding heat equal to or higher than a vaporization temperature of the base material to form the first region 210 by the keyhole welding method.

Since the second laser beam 280 forms the second region 220 with a wider width and a shallower depth than the first laser beam 270, it provides the welding heat at the melting temperature level of the base material. Since the second region 220 overlapping the first region 210 is welded by the conduction welding method, the pores or spatter generated in the formation of the first region 210 may be removed along with the formation of the second region 220.

Figure 6:
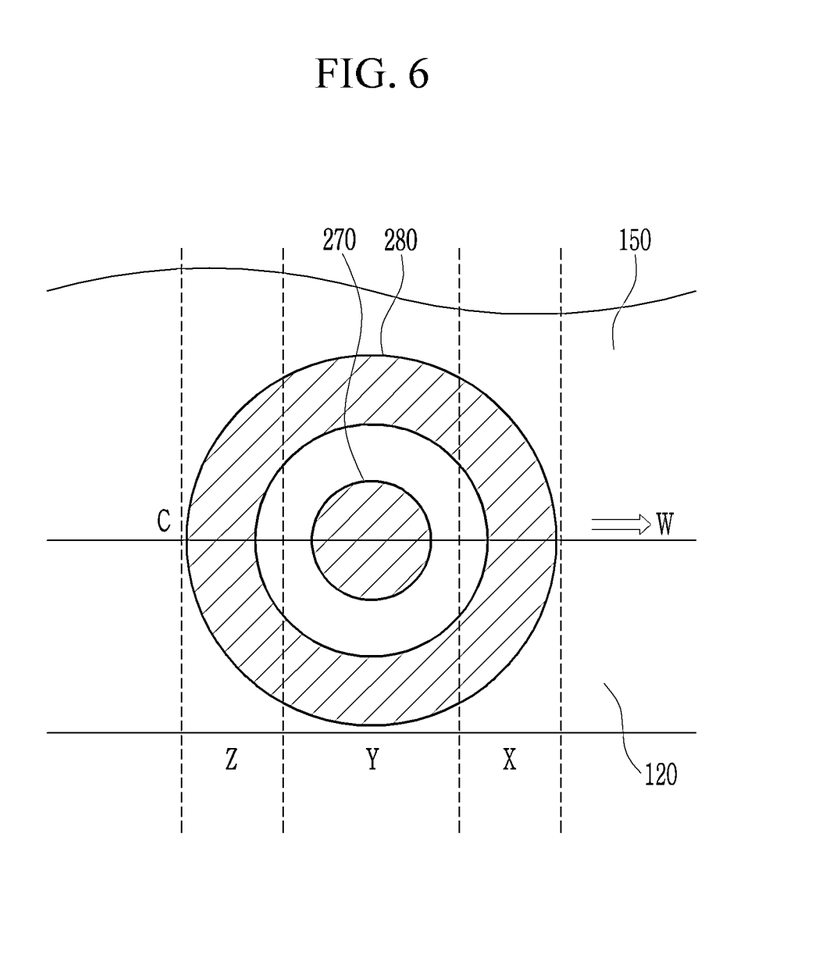
FIG. 6 is a view showing a shape that a first laser beam and a second laser beam are irradiated in a welding method of a rechargeable battery according to an exemplary embodiment of the present invention.

Meanwhile, FIG. 6 is a view showing the shapes of the first laser beam 270 and the second laser beam 280 irradiated to the rechargeable battery in the welding method of the rechargeable battery according to an exemplary embodiment of the present invention. According to an exemplary embodiment of the present invention, in the welding step, the second laser beam 280 may be simultaneously irradiated to the front and rear of the first laser beam 270 based on the welding progressing direction W.

FIG. 6 distinguishes a region where the second laser beam 280 is irradiated on the front side along the welding progressing direction W based on the first laser beam 270 at the center as a region X, a region where the welding is performed by the first laser beam 270 as a region Y, and a region to which the second laser beam 280 is irradiated on the rear side of the first laser beam 270 as a region Z.

The region X corresponds to a region that preheats the corresponding region before the first region 210 is formed by the first laser beam 270. Accordingly, the welding quality is improved when the first region 210 is formed by the first laser beam 270, and particularly, a molten pool is formed before the first region 210 is formed, thereby suppressing the formation of inappropriate results such as pores or spatter.

The region Y is a region in which the first laser beam 270 is irradiated to a portion preheated by the second laser beam 280 in front of the first laser beam 270 to form the first region 210. The first laser beam 270 has higher energy than the second laser beam 280 and forms the first region 210 having the deep depth.

The region Z is a region that post-heats the corresponding region after the first region 210 is formed by the first laser beam 270. Even if preheated by the region X, pores may be generated around the first region 210 to which high energy of the first laser beam 270 is applied in the region Y, and the surface of the cap plate 150 may be uneven due to the spatter, however the pores, etc. may be removed and the surface may be restored by the post-heating, that is, performing the conduction welding, and the molten pool may be stably maintained.

That is, an exemplary embodiment of the present invention simultaneously irradiates the second laser beam 280 to the front and rear of the irradiation region of the first laser beam 270 for the formation of the first region 210, thereby the welding quality may be effectively improved by forming the first region 210 and simultaneously performing continuously and simultaneously the preheating and the post heating.

Figure 7:
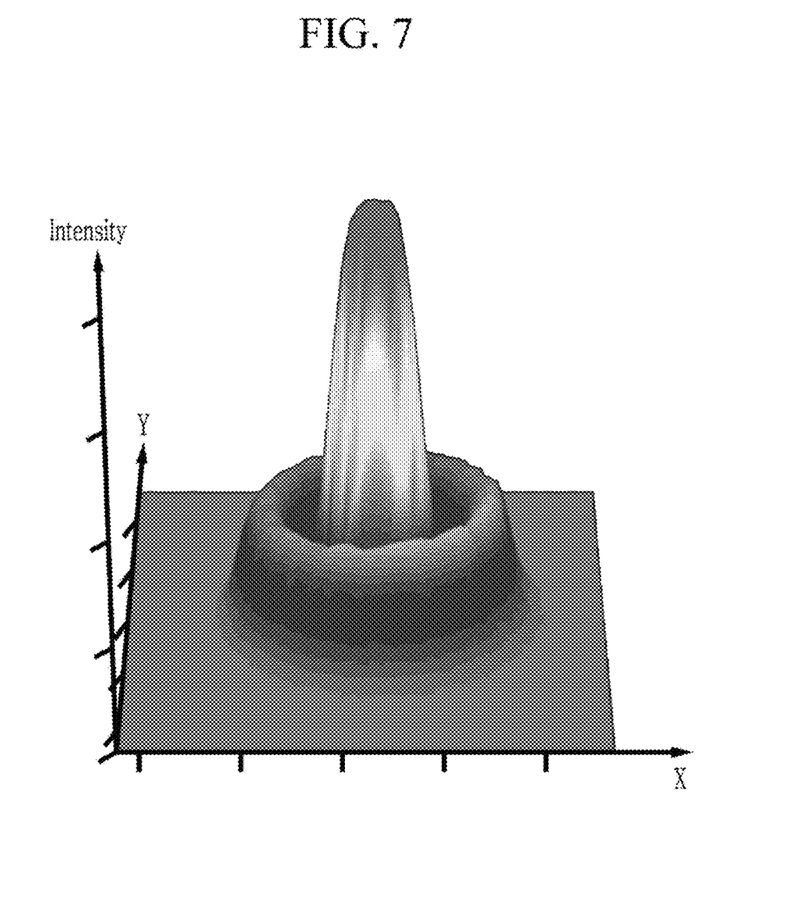
FIG. 7 is a graph showing the intensity of a first laser beam and a second laser beam in a method of welding a secondary battery according to an embodiment of the present invention.

FIG. 7 is a graph showing a difference of an energy intensity of the first laser beam 270 and the second laser beam 280 shown in FIG. 6. In FIG. 7, a horizontal axis (an X axis) and a diagonal axis (a Y axis) correspond to coordinate values of the surface where the welding is actually performed, and a vertical axis (intensity) indicates the intensity of the laser beam according to the coordinate values.

In the welding step according to an exemplary embodiment of the present invention, the second laser beam 280 may be separated from the first laser beam 270 and may be irradiated with a ring shape surrounding the first laser beam 270.

The second laser beam 280 is provided in the ring shape and then is advantageously irradiated simultaneously with the first laser beam 270 and simultaneously irradiated to the front and rear of the first laser beam 270.

In addition, the fact that the second laser beam 280 has the separation distance from the first laser beam 270 on the center side forms a section in which a vaporized gas generated inside the base material, that is, the cap plate 150 and the case 120, may be discharged when the welding at the corresponding part.

In various exemplary embodiments of the present invention, the separation distance may be increased or decreased as needed, but in an exemplary embodiment of the present invention shown in FIG. 6 and FIG. 7, the welding gas is effectively discharged by separating the first laser beam 270 and the second laser beam 280 from each other.

Meanwhile, in the welding method of the rechargeable battery according to an exemplary embodiment of the present invention, the depths of both sides in the width direction of the second region 220 may be formed differently with respect to the contact surface C in the welding step.

As described above, even if the thickness of the side wall of the case 120 is reduced or the position of the contact surface C of the case 120 and the cap plate 150 is changed, it is advantageous in performing the welding while minimizing the restriction on the formation part of the welding bead part 200.

On the other hand, one side of the width direction of the second region 220 of the welding bead part 200 around the contact surface C is positioned closer to the inner space 125 than the other side, and in the welding step, the depth of one side of the second region 220 may be formed to be shallower than the other side.

In addition, the first contact point 232 is positioned closer to the inner space 125 than the second contact point 234, and in the welding step, the depth of the first contact point 232 may be formed to be shallower than the second contact point 234.

While the present invention has been particularly illustrated and described with reference to specific embodiments thereof, it will be apparent to those of ordinary skill in the art that various changes in form and details may be made without departing from the scope of the invention as defined by the following claims.

DESCRIPTION OF SYMBOLS

| -Description of symbols- | |
| --- | --- |
| 110: electrode assembly | 120: case |
| 125: inner space | 150: cap plate |
| 152: terminal portion | 154: vent hole |
| 155: electrolyte injection opening | 200: welding bead part |
| 210: first region | 215: first boundary line |
| 220: second region | 225: second boundary line |
| 227: one end of second boundary line | 228: the other end of second boundary line |
| 232: first contact point | 234: second contact point |
| 270: first laser beam | 280: second laser beam |

The invention claimed is:

1. A rechargeable battery comprising:
a case in which an electrode assembly is accommodated in an inner space and one side is opened;
a cap plate closing and sealing one surface of the case; and
a welding bead part formed along a circumference of the cap plate and formed at a contact surface of the case and the cap plate,
wherein the welding bead part includes a first region and a second region on a cross-section vertical to a welding progressing direction of the welding bead part,
the first region has a first boundary line on the cross-section, the contact surface of the case and the cap plate is disposed between both end parts of the first boundary line,
the second region has a second boundary line on the cross-section, the first region is disposed between both end parts of the second boundary line to form a first contact point and a second contact point in contact with the first boundary line such that the first contact point and the second contact point are on opposite sides of the contact surface of the case and the cap plate, and
the first region has a deeper depth than the second region, and the second region has a wider width than the first region.

2. The rechargeable battery of claim 1, wherein the first contact point and the second contact point have a depth of 30-60% based on a highest depth of the first region.

3. The rechargeable battery of claim 1, wherein based on a width direction of the welding bead part, the first contact point and the second contact point are positioned between 40-60% with respect to any of both end parts of the second boundary line on the contact surface.

4. The rechargeable battery of claim 1, wherein the first contact point and the second contact point have different depths.

5. The rechargeable battery of claim 4, wherein the second boundary line is formed asymmetrically so that both sides have different depths based on the contact surface.

6. The rechargeable battery of claim 5, wherein one end part of the second boundary line is closer to the inner space and has a shallower depth than another end part of the second boundary line.

7. The rechargeable battery of claim 6, wherein
the first contact point is disposed closer to the inner space than the second contact point, and
the second contact point has the deeper depth than the first contact point.

8. A welding method of a rechargeable battery, comprising:
disposing a cap plate on one surface of a case where an electrode assembly is accommodated inside an inner space and one surface is opened; and
forming a welding bead part by welding a contact surface between the cap plate and the case along a circumference of the cap plate,
wherein in the welding,
the welding bead part is formed to have a first region and a second region on a cross-section vertical to a welding progressing direction,
the first region has a first boundary line, the contact surface between the cap plate and the case is disposed between both end parts of the first boundary line,
the second region has a second boundary line, the first region is positioned between both end parts of the second boundary line to form a first contact point and a second contact point in contact with the first boundary line such that the first contact point and the second contact point are on opposite sides of the contact surface between the case and the cap plate, and
the first region is formed to have a deeper depth than the second region, and the second region is formed to have a wider width than the first region.

9. The welding method of the rechargeable battery of claim 8, wherein
in the welding,
the first region is formed by a keyhole welding method using a first laser beam, and
the second region is formed by a conduction welding method using a second laser beam.

10. The welding method of the rechargeable battery of claim 9, wherein
in the welding,
the second laser beam is simultaneously irradiated to the front and rear of the first laser beam based on the welding progressing direction.

11. The welding method of the rechargeable battery of claim 10, wherein
in the welding,
the second laser beam is separated from the first laser beam and is irradiated in a ring form surrounding the first laser beam.

12. The welding method of the rechargeable battery of claim 8, wherein
the welding forms different depths of both sides of the second region based on the contact surface.

13. The welding method of the rechargeable battery of claim 12, wherein
based on the contact surface, one side of the second region is positioned closer to the inner space than the other side, and
in the welding, the depth of one side of the second region is shallower than that of the other side.

14. The welding method of the rechargeable battery of claim 13, wherein
the first contact point is disposed closer to the inner space than the second contact point, and
the welding forms the depth of first contact point to be shallower than that of second contact point.

15. The rechargeable battery of claim 1, wherein the contact surface is located between the first contact point and the second contact point.

16. The rechargeable battery of claim 1, wherein the first contact point is located in the cap plate.

17. The rechargeable battery of claim 16, wherein the second contact point is located in the case.

18. The rechargeable battery of claim 1, wherein the bottommost point of the first boundary line overlaps the contact surface.

19. The rechargeable battery of claim 1, wherein the first region overlaps the contact surface more than the second region.

20. The rechargeable battery of claim 1, wherein the curvature of the first boundary line is greater than the curvature of the second boundary line.

* * * * *